United States Patent
Köhler Ludwig

[11] 3,979,936
[45] Sept. 14, 1976

[54] METHOD AND APPARATUS FOR SIZING NUCLEAR FUEL ROD CLADDING TUBES

[75] Inventor: Köhler Ludwig, Nurnberg, Germany

[73] Assignee: Kraftwerk Union Aktiengesellschaft, Mulheim, Germany

[22] Filed: Nov. 5, 1974

[21] Appl. No.: 521,144

[30] Foreign Application Priority Data
Nov. 7, 1973 Germany............................ 2355698

[52] U.S. Cl................................. 72/56; 29/421 R; 72/63; 72/468
[51] Int. Cl.² ......................................... B21D 26/02
[58] Field of Search............. 72/54, 56, 57, 63, 468; 29/421 R

[56] References Cited
UNITED STATES PATENTS
3,247,693 4/1966 Green ..................................... 72/54
3,657,793 4/1972 Scharf............................. 29/421 R
3,688,535 9/1972 Keinanen et al....................... 72/63

*Primary Examiner*—Carl E. Hall
*Attorney, Agent, or Firm*—Kenyon & Kenyon Reilly Carr & Chapin

[57] ABSTRACT

Nuclear fuel rod cladding tubes are sized internally to diameters precisely fitting nuclear fuel pellets with which the tubes are charged, by externally applying hydraulic pressure to short lengths of each tube, the pressure being applied while the tube is stationary and the tube then moved to bring a new length within the hydraulic pressure zone. The volume of the hydraulic liquid used and the pressure applied to this liquid is such that the liquid is compressed slightly so that the length being sized yields, the expansion of the liquid then completing the sizing. The lengths being sized step-by-step are internally supported by either the fuel pellets or a mandrel having the same diameter as the pellets.

3 Claims, 3 Drawing Figures

METHOD AND APPARATUS FOR SIZING NUCLEAR FUEL ROD CLADDING TUBES

BACKGROUND OF THE INVENTION

The present invention is an improvement on the method and apparatus disclosed by the U.S. Scharf et al. U.S. Pat. No. 3,657,793, dated Apr. 25, 1972, and which is hereby incorporated as a reference forming part of the present disclosure.

Precisely stated, the patented method and apparatus concerns the sizing of nuclear fuel rod cladding tubes to bring their insides to diameters substantially precisely fitting the fuel pellets charged in them, for the purpose of reducing to a minimum the play or spacing between the fuel pellets and the insides of the cladding tubes. If this play or spacing is too great, when the fuel rods are in service in a reactor and under the external pressure of a pressurized coolant, the cladding tubes can collapse with the formation of folds weakening the cladding tubes and possibly resulting in a leaky fuel rod. According to the Scharf et al. patent, the play or spacing between the fuel pellets and the insides of the cladding tubes, is reduced to a maximum of 30 $\mu$, for example.

This is done by the operation of an apparatus comprising an annular pressure chamber having a passage surrounded by the chamber and through which a short length of a cladding tube may be positioned with at least this length containing an internal support having substantially the diameter of the pellets, the support being either the pellets themselves charged into the tube, or a mandrel. A non-metallic elastically-deformable annular seal is inside the chamber for surrounding and sealing the length relative to the pressure chamber, and a high-pressure hydraulic pump is connected to the chamber, this pump having a cylinder with a solid-walled or valveless working portion connected to the chamber, and a reciprocating piston in this working portion, and the pump is provided with an electric solenoid actuator for the piston, the patent also suggesting a pump with appropriate valves although not further disclosing such a pump.

The patented apparatus also includes a means for pushing the cladding tube length-by-length or step-by-step through the hydraulic pressure chamber, this means being timed to the operation of the pump's piston so that each time that piston is effecting a return stroke, a new length of cladding tube is pushed into the pressure zone of the pressure chamber, the cladding tube then being briefly stationary while the pump's piston is forced through a forward stroke, the hydraulic pressure in the chamber compressing the cladding tube against the fuel pellets or mandrel on its inside, and thereby sizing the tube to the precise diameter required to provide the 30 $\mu$ tolerance maximum considered permissible.

This patented method and apparatus has proved to operate well technically. Both the cladding tube and the fuel pellets are cylindrical, and fuel pellet cladding tubes are ordinarily made of stainless steel, Zircaloy or other metal or alloy having adequate ductility so that under the hydraulic pressure transmitted to the cladding tube through the elastic seal of the patented apparatus, the tube yields and plastically deforms to permit the desired sizing.

When the sizing is done with the fuel pellets on the inside of the cladding tube, the degree of hydraulic pressure applied must be controlled with precision to effect the desired sizing without unduly compressing the fuel pellets themselves. It has proven difficult to provide such precision.

Furthermore, although it would seem that with the tube compressed by hydraulic pressure, that the pressure should be uniform throughout each length progressively sized in the tube's step-by-step progress through the pressure chamber, but under fuel-rod production operating conditions, the cladding tube receives a slightly crowned deformation. This condition must be compensated for by having the successive compression zones overlap each other to an extent undesirably slowing down production rates.

SUMMARY OF THE INVENTION

The object of the present invention is to provide for a more precise control of the hydraulic pressure applied to the cladding tube and to effect a more truly cylindrical deformation of the tube lengths successively compressed to obtain the desired inside size.

To effect this improvement, the previously described piston is actuated entirely mechanically as by connecting it through a connecting rod to the swinging end of a crank arm rotated by a suitable motor. As described before, the piston reciprocates and the advancement of the cladding tube through the pressure chamber is timed to achieve the step-by-step compression of the tube lengths in the pressure chamber. However, the stroke length of the pump's piston and the volume of hydraulic fluid between its front end in the cylinder, the necessary high pressure pipe and in the hydraulic pressure chamber, are relatively proportioned so that when the piston reaches its extreme forward position the pressure in the hydraulic chamber is just enough to slightly exceed the yield point of the ductile metal cladding tube, the expansion of the hydraulic liquid then being used to complete the deformation of the tube which is then in its plastically yielding condition so that the pressure exerted by the expansion of the hydraulic liquid completes the sizing operation. Using the crank arm and connecting rod arrangement, the forward reciprocative limit of the pump's piston can be precisely fixed and, of course, the volume of liquid compressed is a known factor. All hydraulic liquids, including the oil commonly used for hydraulic pressure applications, are compressible. For example, such oil has a compressibility of approximately 5% under a pressure of 1,000 bar. The exact compressibility of such oils are known, and until the tube's yield point is reached, the exact volume of oil compressed during the operation of the present invention, can be precisely determined as of the time the pump's piston reaches the limit of its advanced stroke and hesitates due to the crank arm turning through dead center. The plastic yield of the metal is extremely rapid. It follows that the application of the pressure to the tube is more precisely controlled than was heretofore possible.

To obtain a more truly cylindrical compression, with the present invention an axially-rigid radially-flexible ring of truly cylindrical shape is interposed between the non-metallic pressure chamber seal of the patented apparatus, and the tube length being subjected to the compression step. This ring remains within the pressure chamber at all times, the tube lengths being successively pushed through, step-by-step through this ring. In this way, in a positive mechanical manner, the hydraulic pressure is transmitted to the tube length under compression, with assurance that a truly cylindrical tube contour will result.

Such a ring is provided by the present invention in the form of a steel cylinder of adequate wall thickness for the axial rigidity, the ring being alternaly slotted inwardly from its opposite ends with the slots overlapping but not extending far enough to interrupt the circumferential continuity of the ring. Preferably the slots are positioned diagonally with respect to the cylindrical ring's axis. The slots provide the desired radial flexibility, and since the ring is made of steel, it is elastic, its necessary radial deformation for adequate compression of the tube length being inadequate to exceed the elastic limit of the steel from which the ring is made.

BRIEF DESCRIPTION OF THE DRAWINGS

The presently preferred mode for carrying out the present invention is schematically illustrated by the accompanying drawings, in which.

DETAILED DESCRIPTION OF THE INVENTION

Figure 1:
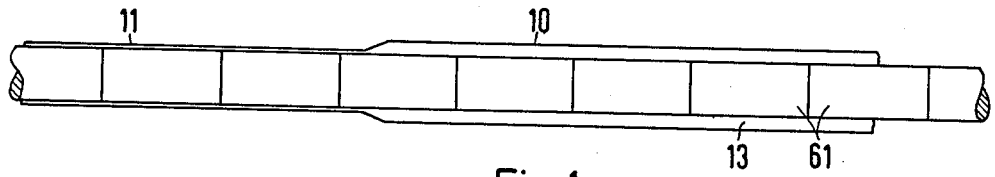
FIG. 1 is a longitudinal section showing the fundamental principles of the prior art step-by-step compression which sizes the tube in accordance with the previously referred to Scharf et al. patent.
Figure 2:
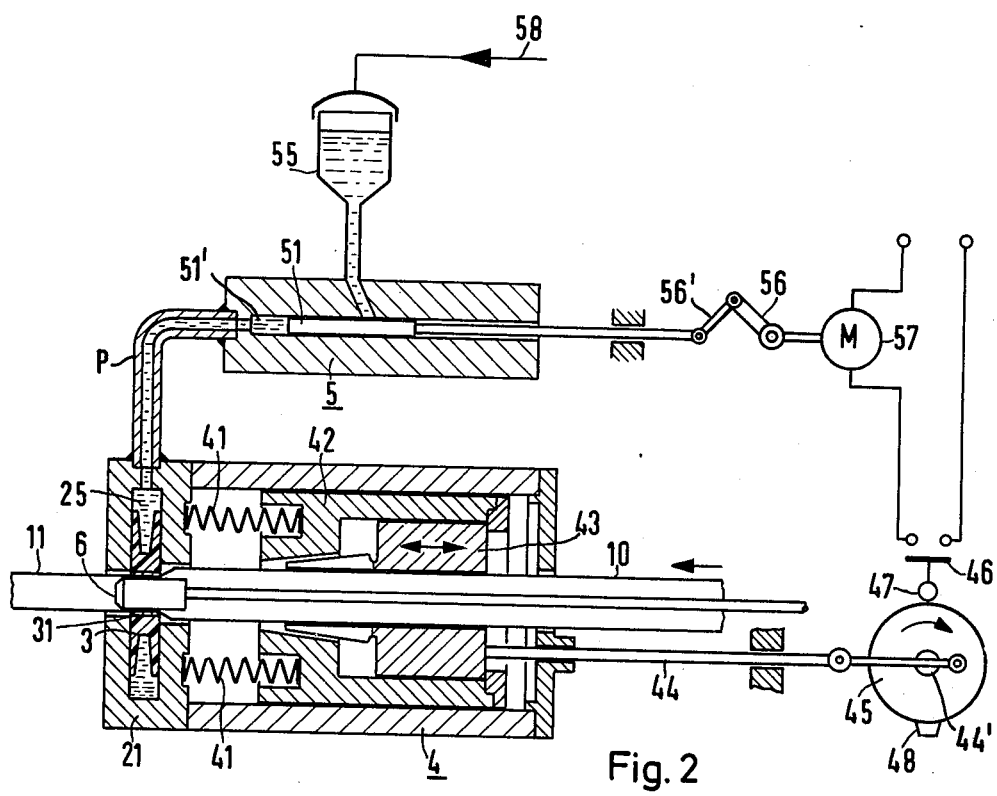
FIG. 2 generally corresponds to FIG. 3 of the aforementioned Scharf et al. patent, but shows the improvement of the present invention.
Figure 3:
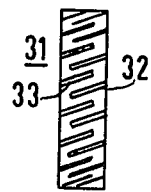
FIG. 3 is a side view of a detail.

In these drawings, FIG. 1, substantially corresponding to FIG. 2 of the aforementioned Scharf et al. patent, shows the fuel rod cladding tube 10 for the nuclear fuel pellets 61. Although exaggerated in scale, it can be seen that on the right-hand side of FIG. 1 there is the excessive play or spacing 13 of the cladding tube 10, as uncompressed, relative to the fuel pellets 61. To the left is shown the compressed cladding jacket 11 so that the play or spacing 13 has been eliminated or reduced to a satisfactory maximum so that when in service the fuel rod, which includes these components, can operate satisfactorily under the high pressure of the pressurized reactor core coolant.

FIG. 2 shows the hydraulic high-pressure pump 5 from which the hydraulic oil is fed through a high-pressure pipe P to the annular or ring-like hydraulic chamber 25 containing the annular non-metallic elastically-flexible sealing ring 3 which seals the pressure chamber 25 relative to the cladding tube, initially having the larger diameter of the portion 10, and by the hydraulic compression step reduced to the diameter of the portion 11.

The high pressure pump 5 is formed by the cylinder 51' in which the piston 51 reciprocates, and to keep the hydraulic system completely filled with hydraulic oil, the supply tank 55 connects with the cylinder 51' at its rear and beyond its working stroke portion, this supply 55 being maintained under pressure adequate to eliminate the risk of gas bubbles such as would interfere with calculations requiring knowledge of exact liquid volumes. Within the annular seal 3, which may be made of a synthetic rubber material, is located the previously described axially-rigid, radially-flexible steel ring 31 having the slots 32 extending diagonally relative to the axis of the cylindrical ring inwardly from the right-hand side of this ring, and the slots 33 extending at an equivalent angularity inwardly from the left-hand side of the ring. The slots 32 and 33 overlap, but in no instance extend completely through the ring. It is these slots that provide the radial flexibility without interfering with the desired axial rigidity, the latter being ring of by making the ring adequate wall thickness.

As shown by the Scharf et al patent, the cladding tube under process is advanced step-by-step through the chamber 25 by a chuck having the springs 41, the head 42 and the jaw-carrier 43, this chuck assembly being reciprocative as described in the previously referred to patent by a reciprocating rod 44 crank-driven by a power shaft 44' and which turns a cam wheel 45 for operation of an electric switch 46 via a cam follower 47 and a cam riser 48 on the cam wheel 45. The shaft 44' is continuously rotated to move cladding tubes forward step-by-step.

Each time the cladding tube is stationary, the switch 46 is closed, powering the piston 51 of the pump 5 via the crank arm 56 and connecting rod 56', the crank arm being rotated by a motor 57 through one cycle each time the switch 46 is closed.

In its retracted position the piston 51 clears the feeding part of the oil supply tank 55 in which the bubble suppressing pressure is maintained via a pipe line 58. Once the switch 46 is closed, the motor 57 turns the crank arm 56 through one complete revolution, this advancing the piston 51 and the cylinder 51', and when this piston is at the forwardmost point of its advance stroke and at its pause caused by the crank 56 reaching dead center, the pressure has then risen to a point where, considering the volume of hydraulic liquid in the cylinder 51' in front of the piston 51 and in the pipe P and in the pressure chamber 25, it is slightly in excess of that required for the metal of the cladding tube to go above its yield point, the piston 51 then being in its hesitation or pause stage and the hydraulic oil of known volume then expanding to carry the now yielding metal of the cladding tube radially inwardly, radially compressing the die ring or cylinder 31, and with the tube metal now yielding, the hydraulic oil expansion completing the inward deformation or sizing of the cladding tube wall against the internal support, in this case being shown as a mandrel 6, although it could be the fuel pellet 61 shown in FIG. 1.

As the piston 51 begins its return stroke because of the rotation of the crank arm 56 through one cycle, the die ring 31, having been only elastically deformed, springs outwardly together with, of course, the non-metallic sealing member 3.

With the shaft 44' continuously rotating, the arrival of the crank and connecting rod arrangement driven thereby at its dead center position has, of course, held the tube stationary during the above-described compression step. With the pressure in the pressure chamber released, continued rotation of the shaft 44' now moves the chuck assembly backwardly so that as the shaft 44' continues to turn the chuck assembly is again moved forwardly, grasping the cladding tube and moving it forwardly for the next step of compression. The chuck assembly reciprocates within the housing 4.

What is claimed is:

1. A method for reducing a metal cladding tube of a nuclear fuel rod, to an inside diameter substantially precisely fitting pellets of nuclear fuel contained in the cladding tube, comprising the step of encircling said tube with a fluid pressure chamber that embraces a short length of said tube and with said length containing an internal support having substantially the diameter of said pellets and with said chamber filled with a compressible fluid, forcing more of said compressible fluid into said chamber to obtain a fluid pressure in the chamber providing a fluid pressure on said tube causing initial yielding of said tube inwardly, and holding said fluid in said chamber so that by expansion of said fluid and with said tube yielding, said tube plastically deforms inwardly onto said internal support to provide said tube with said inside diameter; said pressure being applied by a high-pressure hydraulic pump having a cylinder connected by a pipe to said chamber and containing a piston which moves forwardly in said cylinder, said cylinder and said pipe and said chamber being filled with a substantially constant volume of compressible hydraulic liquid, and said piston being moved forwardly to a position providing said pressure compressing said fluid and causing said initial yielding of said tube, and said piston being then held substantially at said position until said hydraulic liquid expands to plastically deform said tube inwardly onto said internal support.

2. The method of claim 1 in which substantially the entire lengthwise extent of said tube is successively reduced by repeated applications of said step with said tube being moved lengthwise between each application so that length-by-length said tube is provided with said inside diameter.

3. An apparatus for reducing a metal cladding tube to an inside diameter substantially precisely fitting pellets of nuclear fuel contained in the cladding tube, comprising an annular pressure chamber having a passage surrounded by the chamber and through which a short length of said tube may be positioned with at least said length containing an internal support having substantially the diameter of said pellets, a non-metallic elastically-deformable annular seal inside of said chamber for surrounding and sealing said length relative to said pressure chamber, a high-pressure fluid pump having a cylinder with a solid-walled working portion and a pipe through which said working portion is connected to said chamber and a reciprocative piston in said working portion, reciprocating means for mechanically reciprocating said piston with a pause between forward and backward strokes, moving means for intermittently moving said tube length-by-length through said opening, and means for timing said moving means so that said reciprocating means reciprocates said piston for a forward stroke, as a result of which fluid pressure is placed on said tube causing initial yielding of said tube inwardly, and pause, during which said fluid expands and plastically deforms said tube inwardly onto said internal support, while said tube is stationary and the moving means moves said tube forwardly while said reciprocating means moves said piston backwardly, the cylinder's said working portion, said pipe and said chamber being filled with a substantially constant volume of compressible hydraulic liquid.

* * * * *

UNITED STATES PATENT AND TRADEMARK OFFICE
CERTIFICATE OF CORRECTION

PATENT NO. : 3,979,936
DATED : September 14, 1976
INVENTOR(S) : Ludwig Kohler

It is certified that error appears in the above-identified patent and that said Letters Patent are hereby corrected as shown below:

Column 4, lines 2 and 3, change "the latter being ring of by making the ring adequate wall thickness" to: --the latter being obtained by making the ring of adequate wall thickness--.

Signed and Sealed this

Nineteenth Day of April 1977

[SEAL]

Attest:

RUTH C. MASON
*Attesting Officer*

C. MARSHALL DANN
*Commissioner of Patents and Trademarks*